United States Patent Office 3,021,238
Patented Feb. 13, 1962

3,021,238
FAST BURNING FUELS
John E. Mahan, Bartlesville, Okla., assignor to Phillips Petroleum Company, a corporation of Delaware
No Drawing. Filed Nov. 12, 1952, Ser. No. 320,100
31 Claims. (Cl. 149—1)

This invention relates to rocket fuels. In one of its more specific aspects, this invention relates to hypergolic fuels. In another of its more specific aspects, this invention relates to a method for propelling rockets.

My invention is concerned with new and novel rocket propellants and their utilization. A rocket or jet propulsion device, such as is discussed herein is defined as a rigid container for matter and energy, so arranged that a portion of the matter can absorb the energy in kinetic form and subsequently eject it in a specified direction. The type rocket to which my invention is particularly applied is that type rocket propulsion device designated as a "pure" rocket, i.e., a thrust producer which does not make use of its surrounding atmosphere. A rocket of the type with which my invention is concerned is propelled in response to the steps of introducing a propellant material into a combustion chamber therein, and burning it under conditions that will cause it to release energy at a high but controllable rate immediately after its entry into the combustion chamber.

Rocket propellants in liquid form are advantageously utilized inasmuch as the liquid propellant materials can be carried in a light weight, low pressure vessel and thereafter be pumped into the combustion chamber. It is thus, necessary, that the combustion chamber, although being strong enough to stand high pressure and temperature, need be only large enough to insure combustion. The flow of liquid propellants into the combustion chamber can be regulated at will so that the thrust resulting from continuous or intermittent bursts of power can be sustained. Intermittent burning of the fuel contributes to a longer life of the combustion chamber and of the thrust nozzle.

Various methods and liquid combinations have been found useful as rocket propellants. Some propellants consist of a single material, and are termed "monopropellants." Those propellants involving two materials are termed "bipropellants" and normally consist of an oxidizer and a fuel. Hydrogen peroxide and nitromethane are each well known monopropellants. Well known bipropellants include hydrogen peroxide or liquid oxygen as the oxidant with a fuel component such as ethyl alcohol-water, ammonia, hydrazine or hydrogen. Additional known bipropellants include nitric acid as the oxidizer with aniline or furfural alcohol as the hypergolic fuel component.

When employing 90–100% nitric acid, i.e. "white fuming nitric acid" as the oxidizer in a rocket bipropellant fuel, it is often necessary, dependent upon the specific fuel component, to obtain more effective ignition than would normally be obtained, by dissolving from 6 to 14% by weight of nitrogen dioxide in white fuming nitric acid, thereby forming "red fuming" nitric acid. A fuel component of the bipropellant type described herein is spontaneously ignited upon contacting the oxidizer. For this reason such a bipropellant material is referred to herein as being "hypergolic." A ratio of oxidizer to hypergolic fuel, based upon stoichiometric amounts, can be utilized within the limits of 0.5:1 to 1.5:1 if desired. The efficiency of combustion is less at a ratio below 1:1 and the use of the oxidizer is less economical at ratios above 1:1. However, practical consideration may necessitate the use of higher ranges, even as high as 6:1.

Each of the following objects of the invention will be obtained by at least one of the aspects of this invention. An object of this invention is to provide new rocket propellants. Another object of the invention is to provide a novel hypergolic fuel. Another object of the invention is to provide a method for producing immediate thrust to a rocket-type device. Another object is to provide an improved fast-burning fuel. Other and further objects will be apparent to those skilled in the art upon study of the accompanying disclosure.

In accordance with the broad aspects of this invention, I have found that mixtures of alkenyl monoamines and selected mercaptans, both more fully set forth hereinbelow, either in the presence or absence of a hydrocarbon fuel, form a fuel component which is highly "hypergolic," suitable for use in the propulsion of rockets, guided missiles and the like in conjunction with an oxidizer. The fuel mixtures of the present invention are composed of at least one alkenyl amine or mixtures thereof and at least one selected mercaptan, either component being suitable for use in a major or minor amount. Preferably mixtures containing at least 10% of the alkenyl amine and not more than 90% of the alkenyl amine will be employed. In some instances, lesser amounts of the amine substituents can be used.

The amines which are applicable to use in the present fuel compositions include alkenyl monoamines of the following general formula:

wherein R is a hydrocarbon radical containing at least one olefinic double bond between adjacent carbon atoms. The said carbon atoms are present either in an open chain or a closed chain. The radical can contain aryl groups, such as phenyl; cycloalkyl groups, such as cyclopentyl and cyclohexyl; and cycloalkenyl groups, such as cyclopentenyl and cyclohexenyl with any cyclic groups containing not more than eight carbon atoms. X is at least 1 of the radicals selected from the group consisting of R, hydrogen, alkyl, aryl, aralkyl, alkaryl and cycloalkyl. The total number of carbon atoms in the molecule does not exceed 20.

I prefer to use as R an alkenyl radical in which the olefinic double bond is between carbon atoms which are members of an open chain, such as allyl, 2-butenyl, 3-hexenyl, 3-cyclohexyl-2-butenyl.

Illustrative of the alkenyl amines used in this invention are the following: Mono-, di-, and tributenylamine, mono, di-, and triallylamine, 2-octenylamine, 3-hexadecenylamine, 6-butyl-2-tetradecenylamine, 4-pentenylamine, 2-cyclohexenylamine, 2-cyclopentenylamine, N-2-butenylaniline, N,N-di-2-butenylaniline, N-3-butenyl-o-toluidine, N,N-di-3-butenyl-m-toluidine, N-2-butenyl-o-xylidine, N,N-dibutenyl-m-xylidine, N-p-tolyl-3-pentenylamine, (4-cyclohexyl-3-pentenyl)amine, (4-phenyl-2-heptenyl)amine, (4-p-tolyl-2-hexenyl)amine, N-phenyl-(3-cyclopentyl-4-decenyl)amine, N,N-diallylaniline, N-ethyl-[3-

(3-cyclopentenyl)octyl]amine, N-[2-cyclohexenylethyl]-aniline, N - [2(2-methyl-3-cyclopentenyl)propyl]hexylamine, 2,4-hexadienylamine, N-(1,3-butadienyl)diisohexylamine, di(2,4-octadienyl)amine, cyclohexa dienylamine, N-ethyl-(methylcyclopentadienyl)amine and others. Polymers of the unsaturated amines of this invention which are liquids under the conditions of operation are also applicable.

In addition to the above recited compounds, the total products prepared by the interaction of butadiene and ammonia, in the manner described hereinbelow, are also applicable to the production of hypergolic fuel compositions according to the present invention.

The alkenyl amine fuel constituents of the present invention can be prepared in any suitable manner. Certain alkenyl amines can be prepared by a method disclosed in copending United States application, Serial No. 135,290, filed December 27, 1949, by J. E. Mahan and K. F. Bursack. As disclosed in that copending application, a conjugated hydrocarbon diene containing at least 4 carbon atoms in the molecule is reacted at a temperature of from 50 to 500° F. with ammonia or an organic amine in liquid phase in the presence of sodium hydride or sodamide as a catalyst, to form amination products comprising mono-, di-, and trialkenyl amines together with higher molecular weight amines, including amines which do not form water soluble hydrochlorides.

Mercaptans which form a portion of the hypergolic fuel constituents of this invention in a mixture with the above-described alkenyl amines include compounds of the general formula RSH, wherein R is selected from the group consisting of alkyl and alkenyl groups containing from 3 to 10 carbon atoms. Illustrative of the mercaptans used in this invention are tert-butyl mercaptan, isopropyl mercaptan, allyl mercaptan, n-butyl mercaptan, n-hexyl mercaptan, tert-hexyl mercaptan, tert-octyl mercaptan, nonyl mercaptan, tert-decyl mercaptan, isopropenyl mercaptan, $\Delta^1$-butenyl mercaptan, $\Delta^2$-butenyl mercaptan, $\Delta^3$-butenyl mercaptan, isobutyl mercaptan, and the like.

The fuel constituents of the present invention, i.e., mixtures consisting of an alkenyl amine and a mercaptan are hypergolic in an undiluted state and are also hypergolic when admixed with non-hypergolic materials, particularly hydrocarbons, in a state of dilution as high as 40% by volume of diluent when white fuming nitric acid is used as the oxidant. Suitable non-hypergolic diluents which also may form a portion of the fuel composition include paraffin, cycloparaffin and aromatic hydrocarbons in the $C_5$ to $C_{30}$ range or mixtures thereof, preferably the normally liquid materials. Examples of such hydrocarbon fuels are normal hexane, normal heptane, benzene, kersosene, isooctane, diisopropyl, diisobutylene, cyclohexene, cyclohexane, isodecane, methylcyclohexane, toluene, hexadecane, eicosane, hexacosane, tetratriacontane, picene, cyclononacosane, methylal tetraphenylethylene and the like. Hydrocarbons in the $C_5$ to $C_{16}$ range are preferred.

It is a feature of the fuel mixtures of the present invention that I may utilize as one component a material of a low degree of hypergolicity, such as, for example, tert-butyl mercaptan, to provide fuels having high values of hypergolicity. For example, in some instances the fuel mixtures of the present invention are hypergolic under greater conditions of dilution than either of their components.

Other oxidizers are suitable oxidants for these hypergolic fuels in addition to white or red fuming nitric acid and can be used in the bipropellant fuel compositions of my invention. Suitable oxidants include materials such as hydrogen peroxide, ozone, nitrogen tetroxide, liquid oxygen and mixed acids, especially anhydrous mixtures of nitric and sulfuric acids such as 80 to 90 percent by volume of white or red fuming nitric acid and 10 to 20 percent by volume anhydrous or fuming sulfuric acid.

It is within the scope of this invention to employ, preferably dissolved in the oxidizer, ignition catalysts or oxidation catalysts. These oxidation catalysts include certain metal salts, such as the chlorides and naphthenates of iron, zinc, cobalt and similar heavy materials. As an added feature of this invention the alkenyl amine-mercaptan mixtures of this invention are also useful for providing fast burning fuels for use in rocket engines and the like wherein a hypergolic fuel is not necessarily required. For example, the fuel components of this invention are dispersed in a hydrocarbon, such as the hydrocarbon diluents described above. Even if the resulting solution is not hypergolic with an oxidant such as fuming nitric acid, it can be used together with an oxidant and a suitable igniter as a rocker propellant. These fast burning fuels are particularly useful if, for various reasons, a hypergolic fuel is not desired or required. The alkenylamine-mercaptan mixture of this invention may be added to a hydrocarbon fuel in a minor amount, usually from 1 to 20 percent by volume of the total mixture to produce fast-burning fuels which are non-hypergolic. Suitable fast-burning fuels comprise from 1 to 10 percent by volume of an alkenyl amine-mercaptain mixture described above with 90 to 99 percent by volume of a petroleum fraction gasoline boiling range. Specifically, such a fuel can comprise between 1 and 20 percent by volume of a mixture of 20 percent alkenyl amine, 80 percent tert-butyl mercaptan and 80–90 percent by volume normal heptane.

The advantages of this invention are illustrated in the following examples. The reactants and their proportions and specific ingredients are presented as being typical and are not to be construed as unduly limiting the invention.

EXAMPLE I

Each of the fuel mixtures described hereinbelow was tested for spontaneous ignition employing fuming nitric acid as the oxidizer. In all but the first test, 0.13 ml. of a mixture of monobutenylamine and tert-butyl mercaptan, either pure or including a diluent as a constituent thereof were dropped in a 1″ x 8″ test tube containing 0.3 ml. of fuming nitric acid. Prior to testing, the temperature of the fuel and oxidant was lowered to −40° C. Normal heptane was employed as a diluent to determine the maximum amount of dilution which the candidate fuel mixture would tolerate and retain its hypergolic properties. The results are set forth hereinbelow in Table I.

TABLE I

| Fuel | Oxidant | Maximum percent dilution with retention of hypergolicity | Solidification temp. of undiluted fuel mixture, ° C. |
|---|---|---|---|
| 100% tert-butyl mercaptan | WFNA | | −2. |
| | RFNA | | |
| 20% monobutenyl amine | WFNA | 20 | −83. |
| 80% tert-butyl mercaptan | RFNA | 10 | |
| 30% monobutenyl amine | WFNA | 30 | |
| 70% tert-butyl mercaptan | RFNA | 20 | |
| 40% monobutenyl amine | WFNA | 20 | Below −85. |
| 60% tert-butyl mercaptan | RFNA | 20 | |
| 50% monobutenyl amine | WFNA | 0 | |
| 50% tert-butyl mercaptan | RFNA | 10 | |
| 60% monobutenyl amine | WFNA | 10 | Do. |
| 40% tert-butyl mercaptan | RFNA | 10 | |
| 70% monobutenyl amine | WFNA | 0 | |
| 30% tert-butyl mercaptan | RFNA | 0 | |
| 80% monobutenyl amine | WFNA | 10 | Do. |
| 20% tert-butyl mercaptan | RFNA | 10 | |
| 100% monobutenyl amine | WFNA | 10 | Do. |
| | RFNA | 10 | |

Under the test conditions, tert-butyl mercaptan is solid at −40° C. and is therefore unsuitable for use at that temperature. Mixtures comprising from 20 to 40 percent of monobutenylamine, the remainder being tert-butyl mercaptan, are hypergolic at higher dilutions than either mono-butenylamine or tert-butyl mercaptan when tested alone at −40° C. with white fuming nitric acid.

EXAMPLE II

Tests were conducted according to the procedure described in Example I while maintaining the temperature of the fuel and oxidant at 70° F. The results are set forth below in Table II.

TABLE II

| Fuel | Oxidant | Maximum percent dilution with retention of hypergolicity |
|---|---|---|
| 100% tert-butyl mercaptan [1] | WFNA | [2] 0 |
|  | RFNA | [2] 0 |
| 1% monobutenyl amine | WFNA | [3] 0 |
| 99% tert-butyl mercaptan | RFNA | [2] 0 |
| 2% monobutenyl amine | WFNA | [3] 0 |
| 98% tert-butyl mercaptan | RFNA | [3] 0 |
| 5% monobutenyl amine | WFNA | 10 |
| 95% tert-butyl mercaptan | RFNA | 10 |
| 10% monobutenyl amine | WFNA | 30 |
| 90% tert-butyl mercaptan | RFNA | 30 |
| 20% monobutenyl amine | WFNA | 40 |
| 80% tert-butyl mercaptan | RFNA | 40 |
| 30% monobutenyl amine | WFNA | 20 |
| 70% tert-butyl mercaptan | RFNA | 30 |
| 40% monobutenyl amine | WFNA | 10 |
| 60% tert-butyl mercaptan | RFNA | 10 |
| 50% monobutenyl amine | WFNA | 20 |
| 50% tert-butyl mercaptan | RFNA | 20 |
| 60% monobutenyl amine | WFNA | 20 |
| 40% tert-butyl mercaptan | RFNA | 30 |
| 70% monobutenyl amine | WFNA | 30 |
| 30% tert-butyl mercaptan | RFNA | 30 |
| 80% monobutenyl amine | WFNA | 30 |
| 20% tert-butyl mercaptan | RFNA | 40 |
| 100% monobutenyl amine | WFNA | 30 |
|  | RFNA | 30 |

[1] Tert-butyl mercaptan was not consistently hypergolic under the test conditions wherein fuel and oxidant were employed in stoichiometric amounts required for complete combustion.
[2] No ignition.
[3] Ignited.

These data show that a mixture comprised of 20 volume percent of monobutenyl amine and 80 volume percent of tert-butyl mercaptan was hypergolic at higher dilutions than either of the components when tested alone. A mixture comprised of 80 volume percent of monobutenyl amine and 20 volume percent of tert-butyl mercaptan was hypergolic at a higher dilution in the presence of red fuming nitric acid than either of the components when tested alone.

EXAMPLE III

Tests were conducted according to the procedure described in Example I wherein the fuel compositions comprised mixtures of tributenyl amine and tert-butyl mercaptan. The temperature of both the fuel and oxidant was lowered to −40° C. prior to testing. Results are recorded in Table III below.

TABLE III

| Fuel | Oxidant | Max. percent dilution with n-heptane with retention of hypergolicity | Solidification point of undiluted mixture, °/C. |
|---|---|---|---|
| 100% tert-butyl mercaptan | RFNA |  | −2. |
|  | WFNA |  |  |
| 50% tributenyl amine | RFNA | 20 | Below +87. |
| 50% tert-butyl mercaptan | WFNA | 20 |  |
| 60% tributenyl amine | RFNA | 20 | Do. |
| 40% tert-butyl mercaptan | WFNA | 20 |  |
| 70% tributenyl amine | RFNA | 20 | Do. |
| 30% tert-butyl mercaptan | WFNA | 20 |  |
| 80% tributenyl amine | RFNA | 30 | −87. |
| 20% tert-butyl mercaptan | WFNA | 30 |  |
| 90% tributenyl amine | RFNA | 20 | −83. |
| 10% tert-butyl mercaptan | WFNA | 20 |  |
| 100% tributenyl amine | RFNA | 10 | −81. |
|  | WFNA | [1] 0 | −81. |

[1] No ignition.

The above data show a distinct advantage for the fuel compositions tested. Said fuel compositions are hypergolic at −40° C. under greater dilutions than either of the components when tested alone.

EXAMPLE IV

Tests were conducted according to the procedure described in Example I wherein the fuel compositions comprised mixtures of tributenyl amine and tert-butyl mercaptan, while maintaining the temperature of the fuel and oxidant at 70° F. The results are recorded in Table IV.

TABLE IV

| Fuel | Oxidant | Maximum percent dilution with n-heptane with retention of hypergolicity |
|---|---|---|
| 100% tert-butyl mercaptan [1] | RFNA | [2] 0 |
|  | WFNA | [2] 0 |
| 20% tributenyl amine |  |  |
| 80% tert-butyl mercaptan | WFNA | [3] 0 |
| 30% tributenyl amine | RFNA | 10 |
| 70% tert-butyl mercaptan | WFNA | 10 |
| 40% tributenyl amine | RFNA | 10 |
| 60% tert-butyl mercaptan | WFNA | 20 |
| 50% tributenyl amine | RFNA | 40 |
| 50% tert-butyl mercaptan | WFNA | 30 |
| 60% tributenyl amine | RFNA | 40 |
| 40% tert-butyl mercaptan | WFNA | 40 |
| 70% tributenyl amine | RFNA | 50 |
| 30% tert-butyl mercaptan | WFNA | 50 |
| 80% tributenyl amine | RFNA | 60 |
| 20% tert-butyl mercaptan | WFNA | 50 |
| 90% tributenyl amine | RFNA | 60 |
| 10% tert-butyl mercaptan | WFNA | 50 |
| 100% tributenyl amine | RFNA | 60 |
|  | WFNA | 40 |

[1] Tert-butyl mercaptan was not consistently hypergolic under the test conditions wherein fuel and oxidant were employed in stoichiometric amounts required for complete combustion.
[2] No ignition.
[3] Ignition.

These results show that mixtures comprised of 70–90 percent tributenyl amine and 30–10 percent tert-butyl mercaptan were hypergolic at higher dilutions with n-heptane in the presence of white fuming nitric acid than either tributenyl amine or tert-butyl mercaptan when tested alone.

EXAMPLE V

*Preparation of total aminated product from the direct amination of 1,3-butadiene with ammonia*

A stainless steel pressure reactor was charged with weighed quantities of sodium hydride catalyst and ammonia and then heated to 100° F. (37.8° C.). 1,3-butadiene was then pumped into the reactor at a rate of approximately 3.5 to 4 grams per minute during the course of the reaction. At the end of the reaction period the total reaction product was recovered. This total amination product contained only small amounts of mono-, di- and tributenylamines and consisted primarily of higher boiling amines.

Data for the several runs required for the preparation of this product are recorded below:

| Run No. | Charge, grams | | | Reaction time, hrs. | Reaction temp., ° C. | Reaction press. range, p.s.i.g. | Weight prod., gms. | Yield[1] weight, percent |
|---|---|---|---|---|---|---|---|---|
| | C₄H₆ | NH₃ | NaH | | | | | |
| 1 | 694 | 712 | 40 | 3.0 | 37.8–56.8 | 225–375 | 689.0 | 99.3 |
| 2 | 696 | 703 | 40 | 3.2 | 37.8–54.0 | 225–375 | 672.8 | 96.7 |
| 3 | 708 | 704 | 40 | 2.8 | 35.0–60.0 | 225–390 | 560.5 | 79.2 |

[1] Based on butadiene charged.

Samples of the combined total product from the above described runs were mixed with tert-butyl mercaptan to form fuel compositions according to the manner of the present invention and tested for self-ignition properties in accordance with the procedure described in Example I. The temperature of both the fuel and oxidant was lowered to −40° F. prior to testing. Normal heptane was employed as diluent to determine the maximum amount of dilution which the candidate fuel composition would tolerate and retain its hypergolicity. Results are recorded in the following table.

| Fuel | Oxidant | Maximum percent dilution with retention of hypergolicity | Solidification temp. of undiluted mixture, ° C. |
|---|---|---|---|
| 100% tert-butyl mercaptan | WFNA | | −2 |
| | RFNA | | |
| 50% total amination product 50% tert-butyl mercaptan | WFNA RFNA | 20 | −77 |
| 60% total amination product 40% tert-butyl mercaptan | WFNA RFNA | 20 20 | −77 |
| 70% total amination product 30% tert-butyl mercaptan | WFNA RFNA | 30 30 | −74 |
| 80% total amination product 20% tert-butyl mercaptan | WFNA RFNA | 30 30 | −73 |
| 90% total amination product 10% tert-butyl mercaptan | WFNA RFNA | 10 20 | −73 |
| 100% total amination product | WFNA RFNA | ¹0 ²0 | −43 |

[1] No ignition.
[2] Ignition.

These results show the following:

(1) Tertiary butyl mercaptan is solid at −40° C. and is therefore unsuitable for use at that temperature.

(2) The total amination product, while not solid at −40° C., is not hypergolic at that temperature in the presence of white fuming nitric acid.

(3) Fuel mixtures comprised of 70–90 percent total amination product, the remainder being tert-butyl mercaptan, are hypergolic in the presence of either red or white fuming nitric acids, in equivalent or greater dilutions than either of the components thereof when tested alone.

Tests were conducted according to the procedure described in Example I wherein the above fuel compositions were tested while maintaining the temperature of the fuel and oxidant at 70° F. The results are recorded below.

| Fuel | Oxidant | Maximum % dilution with n-heptane with retention of hypergolicity |
|---|---|---|
| 100% tert-butyl mercaptan | WFNA RFNA | ¹0 ¹0 |
| 20% total amination product 80% tert-butyl mercaptan | WFNA RFNA | ¹0 ¹0 |
| 30% total amination product 70% tert-butyl mercaptan | WFNA RFNA | 20 10 |
| 40% total amination product 60% tert-butyl mercaptan | WFNA RFNA | 20 20 |
| 50% total amination product 50% tert-butyl mercaptan | WFNA FRNA | 40 40 |
| 60% total amination product 40% tert-butyl mercaptan | WFNA RFNA | 40 40 |
| 70% total amination product 30% tert-butyl mercaptan | WFNA RFNA | 60 50 |
| 80% total amination product 20% tert-butyl mercaptan | WFNA RFNA | 60 60 |
| 90% total amination product 10% tert-butyl mercaptan | WFNA RFNA | 60 60 |
| 100% total amination product | WFNA RFNA | 60 60 |

[1] No ignition.

I claim:

1. A fuel composition consisting essentially of at least 10 percent by volume of at least one alkenyl monoamine having the general formula:

$$RN\begin{matrix}X\\X\end{matrix}$$

wherein R is a hydrocarbon radical containing at least one olefinic double bond between adjacent carbon atoms, any cyclic groups therein containing not more than 8 carbon atoms, X is selected from the group consisting of R, hydrogen, alkyl, aryl, aralkyl, alkaryl, and cycloalkyl, the total number of carbon atoms in the molecule being no more than 20; and at least 10 percent by volume of at least 1 mercaptan having the formula RSH wherein R is selected from the group consisting of alkyl and alkenyl radicals having not more than 10 carbon atoms.

2. The fuel of claim 1 wherein said alkenyl monoamine is N-2-butenylaniline.

3. The fuel of claim 1 wherein said alkenyl monoamine is N,N-di-2-butenyl aniline.

4. The fuel of claim 1 wherein said alkenyl monoamine is monobutenylamine.

5. The fuel of claim 1 wherein said alkenyl monoamine is tributenyl amine.

6. The fuel of claim 1 wherein said alkenyl monoamine is allylamine.

7. The fuel of claim 1 wherein said mercaptan is tert-butyl mercaptan.

8. The fuel of claim 1 wherein said mercaptan is allylmercaptan.

9. The fuel of claim 1 wherein said mercaptan is tert-hexyl mercaptan.

10. The fuel of claim 1 wherein said mercaptan is isopropyl mercaptan.

11. The fuel of claim 1 wherein said mercaptan is isopropenyl mercaptan.

12. The fuel of claim 1 wherein a hydrocarbon in the $C_5$ to $C_{16}$ range forms a part of said fuel.

13. A fuel consisting essentially of a mixture of at least 10 percent by volume of N-2-butenyl aniline and at least 10 percent by volume of tert-butyl mercaptan.

14. A fuel consisting essentially of a mixture of at least 10 percent by volume of N,N-di-2-butenyl aniline and at least 10 percent by volume of tert-butyl mercaptan.

15. A fuel consisting essentially of a mixture of at least 10 percent by volume of monobutenyl amine and at least 10 percent by volume of tert-butyl mercaptan.

16. A fuel consisting essentially of a mixture of at least 10 percent by volume of tributenyl amine and at least 10 percent by volume of tert-butyl marcaptan.

17. A fuel consisting essentially of a mixture of at least 10 percent by volume of monoallyl amine and at least 10 percent by volume of tert-butyl mercaptan.

18. A fuel composition consisting essentially of a hydrocarbon in the $C_5$ to $C_{35}$ range, and a mixture of at least 10 percent by volume, based on said mixture, of at least one alkenyl monoamine having up to 20 carbon atoms per molecule and at least 10 percent by volume, based on said mixture, of at least one mercaptan having the formula RSH wherein R is selected from the group consisting of alkyl and alkenyl radicals having not more than 10 carbon atoms per molecule.

19. The fuel composition of claim 18 wherein said alkenyl monoamine is N-2-butenyl aniline.

20. The fuel composition of claim 18 wherein said mercaptan is tert-butyl mercaptan.

21. The fuel composition of claim 18 wherein said alkenyl monoamine is N,N-di-2-butenyl aniline.

22. The fuel composition of claim 21 wherein said mercaptan is tert-butyl mercaptan.

23. The fuel composition of claim 18 wherein said alkenyl monoamine is monobutenyl amine.

24. The fuel composition of claim 23 wherein said mercaptan is tert-butyl mercaptan.

25. The fuel composition of claim 18 wherein said alkenyl monoamine is tri-butenyl amine.

26. The fuel composition of claim 18 wherein said alkenyl monoamine is mono allylamine.

27. A fuel capable of hypergolic reaction with an oxidizer selected from the group consisting of white fuming nitric acid, red fuming nitric acid, hydrogen peroxide, ozone, nitrogen tetroxide, liquid oxygen, and a mixture of at least 80 percent by volume of nitric acid and up to 20 percent by volume of sulfuric acid, in a ratio based upon stoichiometric amounts of at least 0.5 to 1 of oxidizer to fuel, said fuel consisting essentially of a mixture of at least 10 percent by volume of at least one mercaptan having the formula RSH, wherein R is selected from the group consisting of alkyl and alkenyl radicals having up to 10 carbon atoms per molecule and at least 10 percent by volume of at least one alkenyl monoamine having up to 20 carbon atoms per molecule.

28. A fuel consisting essentially of a mixture of at least 10 percent by volume of at least one alkenyl monoamine having up to 20 carbon atoms per molecule, and at least 10 percent by volume of at least one mercaptan having the general formula RSH wherein R is selected from the group consisting of alkyl and alkenyl radicals having not more than 10 carbon atoms.

29. The fuel composition of claim 25 wherein said mercaptan is tert-butyl mercaptan.

30. The fuel composition of claim 26 wherein said mercaptan is tert-butyl mercaptan.

31. The fuel composition of claim 19 wherein said mercaptan is tert-butyl mercaptan.

References Cited in the file of this patent

UNITED STATES PATENTS

| | | |
|---|---|---|
| 2,489,051 | Sayward et al. | Nov. 22, 1949 |
| 2,557,018 | Viles | June 12, 1951 |
| 2,573,471 | Malina et al. | Oct. 30, 1951 |

OTHER REFERENCES

Journal of the American Rocket Society, No. 72, December 1947, page 32. (Copy in Scientific Library.)

Wheeler et al.: Solid and Liquid Propellants, Journal of The Institute of Fuel, volume 30, No. 114, June 1947, pages 137–159. (Copy in Scientific Library.)